United States Patent
Gabriel

(12) 
(10) Patent No.: US 7,300,609 B2
(45) Date of Patent: Nov. 27, 2007

(54) INJECTION-MOULDING TOOL FOR THE PRODUCTION OF INFORMATION CARRIERS IN DISC FORM

(75) Inventor: Markus Gabriel, Muri (CH)

(73) Assignee: AWM Mold Tech AG, Muri (CH)

( * ) Notice: Subject to any disclaimer, the term of this patent is extended or adjusted under 35 U.S.C. 154(b) by 380 days.

(21) Appl. No.: 10/935,425

(22) Filed: Sep. 7, 2004

(65) Prior Publication Data

US 2005/0053691 A1    Mar. 10, 2005

(30) Foreign Application Priority Data

Sep. 8, 2003    (CH)    .................................. 1528/03

(51) Int. Cl.
*B29C 45/73*    (2006.01)
(52) U.S. Cl. ................ 264/1.33; 264/106; 264/328.16; 425/552; 425/810
(58) Field of Classification Search ................ 425/552, 425/810; 264/1.33, 106, 107, 328.16
See application file for complete search history.

(56) References Cited

U.S. PATENT DOCUMENTS

| 1,582,704 | A | | 4/1926 | Sylvester et al. |
| 4,260,360 | A | * | 4/1981 | Holmes et al. ............. 425/548 |
| 6,464,487 | B2 | | 10/2002 | Gabriel |
| 2002/0031570 | A1 | * | 3/2002 | Gabriel ........................ 425/542 |

FOREIGN PATENT DOCUMENTS

| EP | 0 864 411 | | 9/1998 |
| EP | 0 899 075 | | 3/1999 |
| FR | 2 159 231 | | 6/1973 |
| GB | 2 006 666 | | 5/1979 |
| JP | 1-216807 | * | 2/1988 |
| JP | 01 278322 | | 11/1989 |
| JP | 8-281713 | * | 10/1996 |
| JP | 09 094858 | | 4/1997 |
| WO | WO99/37471 | | 7/1999 |

OTHER PUBLICATIONS

English abstract for JP 1-216807, the reference dated Feb. 1988.*
English abstract and computer translation for JP 8-281713, the reference dated Oct. 1996.*

* cited by examiner

*Primary Examiner*—Robert B. Davis
(74) *Attorney, Agent, or Firm*—The Webb Law Firm

(57) ABSTRACT

An injection-moulding tool for the production of a mould in disc form, in particular in the form of information carriers such as CDs and/or DVDs, wherein the injection-moulding tool comprises a first and a second mirror block, wherein the first and second mirror blocks lie opposite each other and are movable in relation to each other for the opening and closing of the mould, and means for actively controlling the temperature of at least one of the first and second mirror blocks. A method for producing mouldings in disc form utilizing the injection-moulding tool is also disclosed.

14 Claims, 3 Drawing Sheets

INJECTION-MOULDING TOOL FOR THE PRODUCTION OF INFORMATION CARRIERS IN DISC FORM

BACKGROUND OF THE INVENTION

1. Field of the Invention

The present invention relates to the field of injection-moulding technology. It concerns an injection-moulding tool for the production of mouldings in disc form, in particular in the form of information carriers such as CDs and/or DVDs,

2. Description of the Related Art

For producing optically readable information carriers such as audio CDs, CD-ROMs, video CDs or DVDs, injection-moulding tools which form an injection mould by means of two (cylindrical) mirror blocks lying opposite each other and movable in relation to each other are used. On one of the two mirror blocks there is usually releasably fastened a thin, disc-shaped stamper, which stamps the tracks containing the information during the injection moulding of the information carrier being formed. At the outer edge, the injection mould is often bounded by a form ring, which concentrically surrounds one of the mirror blocks.

The form ring projects beyond the planar moulding surface of the mirror block enclosed by it and is displaceable in relation to this mirror block in the axial direction. If the injection mould is closed by an axial movement of the two mirror blocks towards each other, the form ring comes to rest on the opposite mirror block on account of the projection and closes the mould, while the mirror block concentrically enclosed by it is at a predetermined distance from the opposite mirror block. The hot plastic is then injected under high pressure into the disc-shaped cavity formed in this way. Once the cavity of the injection mould has been filled, if need be the mirror block enclosed by the form ring is moved a little towards the other mirror block—in order to achieve a high quality of the information carrier—, while the form ring remains fixed in place on the opposite mirror block on account of the stop (see in this respect FIGS. 2 and 3 of WO-A1-99/37471.

In the case of such moulds, the temperature control of the mirror blocks can take place actively, it being possible by this temperature control on the one hand to bring the mirror blocks to a specific increased temperature in preparation (heating up), if need be only within certain phases of the production process, and it being possible in particular on the other hand to carry away the heat introduced into the mould by the hot injected plastic (cooling).

The possibilities of such temperature control are described for example in EP-A-0899075, and also in EP-A-0864411. In this case, the typical procedure is that channels in which an appropriate medium is carried are provided in the mass of the mirror blocks. Such channels are in this case made to follow a spiral path in the mirror block. In order to allow different capacities in different radial regions of the mirror blocks, it is possible to activate different regions of the spirals differently by means of supplying cooling medium differently.

One of the problems of such solutions is that normally, because of the required high homogeneity of the temperature distribution on the mirror block, a multiplicity of channels that are thin and arranged comparatively close together is demanded, and that correspondingly long channels result. This leads to a cooling response time that is too long for present-day cycle times.

SUMMARY OF THE INVENTION

It is therefore the object of the invention to provide an injection-moulding tool for the production of information carriers in disc form which avoids the disadvantages of known injection-moulding tools and is distinguished in particular, but not exclusively, by better process stability, better quality of the mouldings and shorter waiting times during starting-up, and the possibility of faster cycle times. Specifically, it concerns the improvement of an injection-moulding tool for the production of mouldings in disc form, in particular in the form of information carriers such as CDs and/or DVDs, which injection-moulding tool, to form an injection mould, comprises a first and a second mirror block, which lie opposite each other and are movable in relation to each other for the opening and closing of the mould. Means for the active temperature control of at least one of the mirror blocks are also provided.

This object is achieved according to the invention by the means for the active temperature control comprising at least 4 cooling channels which are made to follow parallel concentric paths essentially on circular lines and also at least one feed for the cooling medium and at least one discharge for the cooling medium, the cooling channels being connected to the feed and discharge, respectively, in such a way that the cooling medium carried in the cooling channels is discharged from the mirror block via the at least one discharge after circulating only once.

The essence of the invention is consequently to influence the surface temperature of the mirror blocks by cooling channels which are as short as possible, and consequently respond quickly. For this purpose, the cooling channels, which are made to follow circular lines, are provided in such a way that the cooling medium carried by them circulates only once, and is subsequently discharged again. This is so because, in the case of the spiral cooling channels that are typically used (which are used partly for reasons of simplicity in supplying them with cooling medium) there is the problem that the cooling medium has to cover a long path in the mirror block, and that the efficiency of the temperature control or its response time is correspondingly restricted. The arrangement of a multiplicity of such cooling channels, which run parallel around the centre of symmetry of the mirror block, also makes a homogeneous cooling effect possible. Typically, at least three such cooling channels should be provided, but preferably at least four.

Such a construction can be realized particularly easily with regard to supplying with the cooling medium if all the cooling channels are supplied with the cooling medium via a single feed. This is so because it is typically the reason why cooling channels are spirally provided, since cooling medium can then of course easily be introduced at one end and discharged at the other end. If, however, the concentric cooling channels that are made to follow parallel paths are supplied with cooling medium in parallel and via a single feed provided in the mirror block, the construction is made much more simple, and at the same time ensures high cooling efficiency and speed. It is preferred for the cooling channels to be arranged parallel to the surface of the mirror block that is facing the injection mould and in particular in a region near the surface. Geometrically, the use of a single feed can be realized in that, with further preference, the single feed is arranged in the mirror block in a region away from the surface, and in that the feed is connected to the cooling channels via branches.

According to a first preferred, particularly compact and loss-free embodiment, the feed is arranged in the mirror block essentially in the radial direction, and all the cooling channels are supplied with the cooling medium via branches arranged essentially perpendicular to the surface of the mirror block that is facing the injection mould. For optimally supplying the cooling channels, the feed normally has a large flow cross section in comparison with the cooling channels and/or the branches. If in this case all the branches and all the cooling channels are equally dimensioned, a homogeneous cooling effect over the entire mirror block results, apart from differences attributable to pressure drops and different lengths of the cooling channels (the innermost circle is the shortest). However, allowance for the pressure drops or the different lengths of the cooling channels, or a specific structuring of the cooling profile on the mirror block can be made possible in a precise way in the case of such a construction, although only a single feed is present, in that for example all the cooling channels have identical flow cross sections (simple uniform production), and in that the flow in the individual cooling channels is differently set by means of correspondingly adapted flow cross sections of the branches. It goes without saying that a similar effect can be created if the branches of the discharges from the cooling channels are correspondingly set differently in the flow cross section. A combination of these two measures is also conceivable. The effective flow cross sections of the branches may be set for example by local constrictions (conceivable for example are rings which are to be provided after the production of the bores and which are pushed specifically into the bores of the branches and fastened therein).

A particularly homogeneous distribution of the cooling effect can be achieved if the cooling medium is sent through the cooling channels in accordance with the counter-current principle. Preferably, cooling channels arranged correspondingly next to one another are alternately flowed through by cooling medium in a counter-running way. For example, the cooling medium of the most central cooling channel (with the smallest diameter) runs anticlockwise, in the cooling channel arranged next towards the peripheral region of the mirror block it runs clockwise, and so on.

For uniform cooling, typically a maximum of 8, preferably 4 to 6, cooling channels are sufficient, next to one another in a respective mirror block. It is preferred for the cooling channels to be provided in the range of 4-10 mm underneath the surface of the mirror block that is facing the injection mould. It is preferred for the sake of simplicity for all the cooling channels to be arranged at the same distance from the surface. It is also possible to achieve different cooling capacities in different regions of the mirror block, in that the cooling channels are provided at different distances from the surface.

A compact arrangement of the discharge can be achieved with preference, in that it is arranged in a region away from the surface of the mirror block, this discharge being connected to the cooling channels via branches. Preferably, two discharges are provided, one of which discharges the cooling medium flowing in one direction in one half of the cooling channels, and the other of which discharges the cooling medium flowing in the opposite direction in the other half of the cooling channels (counter-current cooling principle).

A further preferred embodiment of the injection-moulding tool according to the invention is characterized in that a single feed is provided, and in that the 2 discharges or at least their branches are arranged in the mirror block laterally alongside the feed in such a way that, when all the cooling channels are made to follow circular lines and are in each case at the same distance from the surface of the mirror block, an interlocking of the inlets and outlets in the cooling channels results to a certain extent. The effect of the cooling can in this way be made more uniform in the feeding region.

Furthermore, the invention concerns a method for producing mouldings in disc form, in particular in the form of information carriers such as CDs and/or DVDs, using an injection-moulding tool as described above, characterized in that, in the production process, the surface of at least one, preferably both, of the mirror blocks is kept at a defined process temperature by means of the cooling channels, or is controlled or operated in a specifically selective way over the process in a manner corresponding to a defined profile.

Further embodiments of the injection-moulding tool according to the invention and of the method according to the invention emerge from the dependent claims.

BRIEF EXPLANATION OF THE FIGURES

The invention is to be explained in more detail below on the basis of exemplary embodiments in connection with the drawings, in which.

DESCRIPTION OF THE PREFERRED EMBODIMENT

Figure 1:
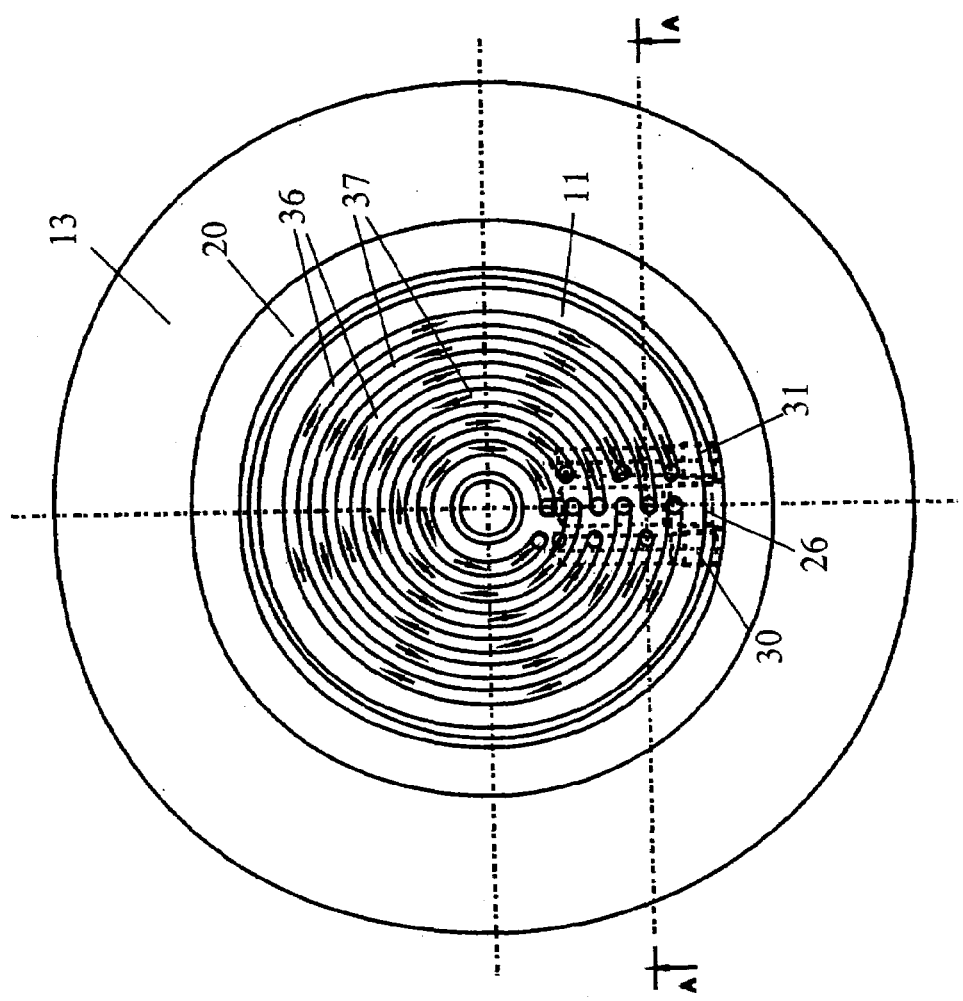
FIG. 1 shows a plan view of a mirror block, illustrating the cooling channels provided in it and their feeds and discharge lines.
Figure 2:
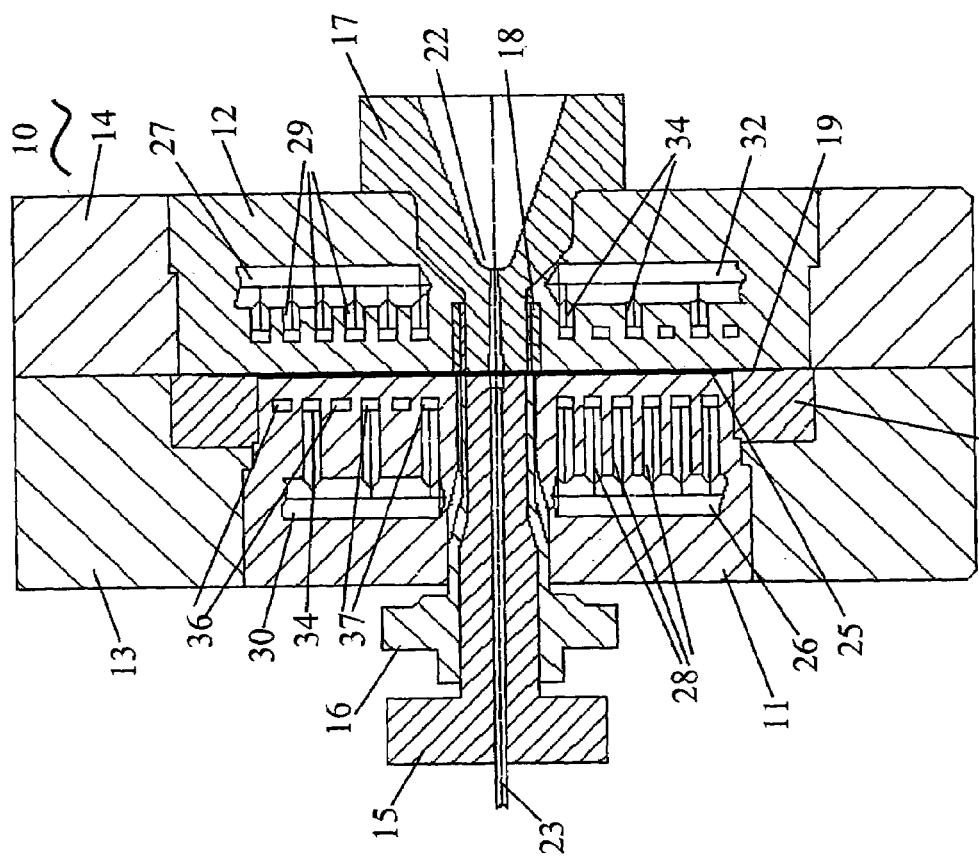
FIG. 2 shows in a longitudinal section a preferred exemplary embodiment of an injection-moulding tool with temperature-controlled mirror blocks according to the invention in a simplified representation, the relative arrangement of the feed and discharge being shown offset for easier representation.

A preferred exemplary embodiment of an injection-moulding tool 10 according to the invention is reproduced in FIGS. 1 and 2. FIG. 1 in this case shows a plan view of the mirror block 11, and FIG. 2 shows a longitudinal section through the entire tool.

The figures are in this case simplified to the extent that the necessary screw fittings, springs, seals and operator-control elements have not been represented. The injection-moulding tool 10, shown in the closed state, comprises as central components a first (left) mirror block 11, a second (right) mirror block 12 and a form ring (venting ring) 20 concentrically enclosing the first mirror block 11, which together form the injection mould 25. The mirror blocks 11, 12 are in each case fitted into a centring ring 13 and 14, respectively, concentrically surrounding them. The information is stamped into the injection-moulded part (the data carrier, the disc) during the injection moulding by means of a stamper 19, which, as a thin disc, bears against the moulding surface of the second mirror block 12 and is held in the centre by a bushing-shaped stamper holder 18. For the connection of the injection-moulding tool 10 to the nozzle of the injection-moulding machine (not represented), a sprue bush 17 reaching through the centre of the second mirror block 12 into the injection mould 25 and opening conically outwards is provided.

Arranged opposite the sprue bush 17, lying concentrically in one another and (indicated by the double-headed arrows) movable in relation to one another, are an ejector sleeve 16, a punch 15 and a sprue ejector 23. With the sprue ejector 23, the sprue 22 remaining in the inner bore of the sprue bush 17 can be ejected. With the punch 15, the central opening in the injection-moulded data carrier is punched out. With the ejector sleeve 16, finally, the finished data carrier can be ejected after the injection mould 25 has been opened.

The form ring 20 is displaceably mounted in the centring ring 13 and is pressed by springs (not represented) in the direction of the second mirror block 12. It can be withdrawn if need be by means of a pneumatically driven actuating element. Usually, the form ring 20 does not bear with its inner side directly against the outer side of the first mirror block 11 but is separated from the latter by a sliding ring, which rests concentrically on the outer side of the first mirror block 11 in an offset provided for this purpose. The sliding ring essentially has the form of a hollow cylinder and preferably consists of copper, a copper alloy such as bronze or else a plastics material such as polytetrafluoroethylene (PTFE, Teflon). It consequently forms for the form ring 20, consisting of steel, and the first mirror block 11, consisting of steel, a sliding bearing with good thermal conduction, which ensures improved heat removal in the edge region of the injection mould 25 and consequently ensures improved optical and electrical values in the outer region of the data carrier, the disc. On account of the good sliding properties, a relatively close fit can be chosen between the sliding ring and the first mirror block 11, so that the formation of flash between the mirror block 11 and form ring 20 is significantly reduced. Instead of a sliding ring, however, a bearing with balls (ball cage, ball grid) may also be used. The use of a bearing with balls has the advantage that possibly existing play is better distributed over the circumference.

The form ring has the function of forming the outer edge of the optical data carrier substrate. At the same time, it serves for cavity venting, which is provided by means of a specific venting gap (not represented). In order to carry out the injection-stamping process, the venting ring must perform an axial longitudinal movement with every injection operation (cycle), in order to close the cavity of the tool not closed around the stamping gap. After or during the injection, the tool is closed by means of the closing force of the injection-moulding machine and moved into its defined end position. In this case, the form ring is withdrawn by the amount of the stamping gap. After removal of the substrate and during the closing operation for starting a new injecting operation, the form ring is advanced, for example by means of spring force.

Different plastics materials (COC, PMMA, PC etc.), formats such as for instance CD-A-ROM, CD-R(W), DVD, DVD-R(W), Blue Ray etc., or different types of stamper, demand production temperatures of about 45 degrees Celsius to 130 degrees Celsius. Even temperatures up to 300 degrees Celsius may be required.

As represented in FIG. 1, means for cooling, i.e. for carrying away the heat occurring in the production process, are then provided in the mirror block 11 (and equally 12). The cooling medium is in this case introduced radially via a single channel, the feed 26, which is provided as a bore in the mass of the mirror block. From this feed 26, a multiplicity of branches 28 branch off to a certain extent parallel to the axis of the mirror block (in the axial direction) to the individual cooling channels 36 and 37. The cooling channels 36 and 37 are arranged underneath the surface 38 of the mirror block. As can be seen from FIG. 1, they are in this case connected to the branches 28 in such a way that the cooling medium flows alternately clockwise (channels 36) and anticlockwise (channels 37). The cooling medium flows through the mirror block only in one circulation, i.e. the cooling medium is not made to follow a spiral path but instead the individual channels are arranged in parallel next to one another on circular lines and, after passing through slightly less than 360°, the cooling medium is discharged again.

Figure 3:
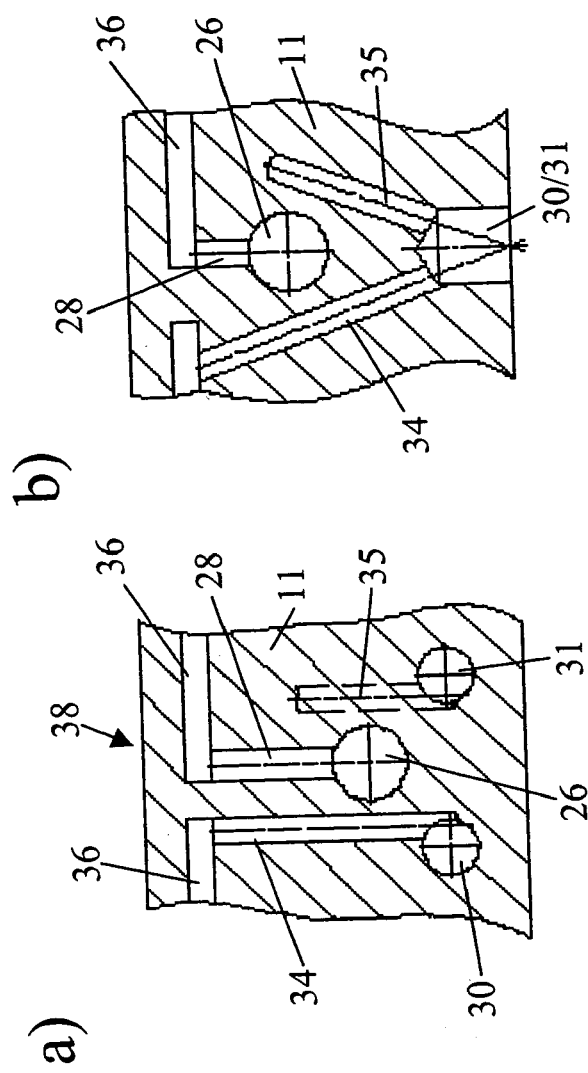
FIG. 3 shows two sections along the line A-A in FIG. 1, a) a section through a mirror block according to FIG. 1, b) a section through a mirror block with angled discharge of the cooling medium.

This takes place through corresponding branches 34 or 35, respectively. It should be noted in this connection that, to make it easier to see, FIG. 2 comprises a V-section and not a purely longitudinal section, since the discharge and feed are normally not arranged opposite but rather next to each other, as can be seen in FIGS. 1 and 3.

Once the cooling medium has circulated once, for example in the innermost cooling channel 37, anticlockwise, it is discharged via the branch 34 in the axial direction and fed to the first discharge channel 30, which for its part is provided in the radial direction in the mass of the mirror block 11. On the other hand, the cooling medium carried clockwise in the outwardly following cooling channel 36 is passed via the branch 35 into a further discharge channel 31 and carried away.

The geometrical arrangement of the feed channel 26 (or 27, respectively) and of the two discharge channels 30 and 31 in an arrangement according to FIG. 1 or 2, respectively, is represented in FIG. 3a). Feed 26 and discharges 30 or 31, respectively, are located on different planes, and are connected to the cooling channels by axial branches.

FIG. 3b) shows an alternative connection possibility; 2 discharges 30 and 31 are not used here, but a single central discharge 30/31, the branches 34 and 35 then having to be provided at an angle to allow for the cooling medium to be carried in counter-current in the channels 36 or 37, respectively.

As can be seen in the plan view according to FIG. 1, the specific way in which the feed and discharge are made to run and the counter-current of the cooling medium have the effect to a certain extent of bringing about an interlocking of the cooling medium channels in the feeding region, which makes a more homogeneous distribution of the cooling effect possible in this region.

A large number of advantages can then be achieved by the active temperature control of the mirror block(s) realized by means of parallel cooling channels with only one circulation in each:

The required production temperature can be set very rapidly (short paths of the cooling medium). The cycle times can be improved correspondingly (typically, the cycle times can be shortened by up to 10 to 20 percent).

The short cooling channels allow very effective removal of the heat occurring. A higher cooling capacity than in the case of following a spiral path is achieved. The temperature difference between the inlet and outlet remains correspondingly low; this results in increased homogeneity of the cooling.

The cooling medium can be made to flow with counter-current or co-current in the channels.

Only one cryostat (temperature-control unit) is required, since only one feed line is provided.

The single feed simplifies the construction.

Furthermore, specific constrictions may be provided in the branches 28 or 29 and 34 or 35, respectively, making it possible for the cooling capacity to be set differently in different circular rings. This is without making it necessary for different cryostats to be used.

The parallel and not spiral way in which the cooling channels are made to run leads to a more homogeneous temperature distribution on the surface of the mirror blocks. Problems such as birefringence, dishing, jitter, pit replication, etc. are reduced as a result.

The system can also be used particularly advantageously in connection with pulsed cooling, in which the cooling medium is not continuously circulated but made to flow in surges, dependent on the stage of the process. For example, the cooling system may be filled with cool cooling medium in one surge during or directly after the injection of the polymers, so that the heat is absorbed by this cooling medium. Subsequently, however, this warm cooling medium is at first left in the mirror block, in order to ensure that polymer injected in the next cycle does not enter an excessively cooled cavity, correspondingly resulting in inadequate formation of the pits and grooves.

The invention claimed is:

1. An injection-moulding tool for the production of a mould in disc form, wherein the injection-moulding tool comprises:
   a first and a second mirror block, wherein the first and second mirror blocks lie opposite each other and are movable in relation to each other for the opening and closing of the mould;
   means for actively controlling the temperature of at least one of the first and second mirror blocks wherein the means comprise at least 4 cooling channels, wherein the cooling channels are constructed to follow parallel concentric paths essentially on circular lines;
   at least one feed for cooling medium and a first discharge for the cooling medium, wherein the cooling channels are connected to the feed and the first discharge so that the cooling medium carried in the cooling channels is discharged from the mirror block via the first discharge after circulating only once; and
   wherein the cooling channels are supplied with the cooling medium via a single feed within the mirror block, wherein the cooling channels are arranged parallel to the surface of the mirror block that is facing the injection mould and are arranged in a region near the surface, and wherein the single feed is arranged in the mirror block in a region away from the surface and is connected to the cooling channels via branches.

2. The injection-moulding tool according to claim 1, wherein the feed is arranged in the mirror block essentially in a radial direction, and wherein the cooling channels are supplied with cooling medium via the branches, wherein the branches are arranged essentially perpendicular to the surface of the mirror block that is facing the injection mould.

3. The injection-moulding tool according to claim 2, wherein the feed has a larger flow cross section than one of the cooling channels and the branches, and wherein the cooling channels have identical flow cross sections, and wherein flow cross sections of the branches are adapted to cause flow in corresponding cooling channels to flow in different directions.

4. The injection-moulding tool according to claim 3, wherein the effective flow cross sections of the branches are set by local constrictions.

5. The injection-moulding tool according to claim 3, wherein the cooling channels arranged next to one another are alternately flowed through by cooling medium in a counter-running direction.

6. The injection-moulding tool according to claim 1, wherein a maximum of 8 cooling channels are arranged next to one another in at least one of the first and second mirror blocks, and wherein the cooling channels are situated from 4-487 10 mm underneath the respective surface of the first and second mirror blocks that are facing the injection mould, and wherein each of the cooling channels are arranged at the same distance from the surface.

7. The injection-moulding tool according to claim 1, wherein the first discharge is arranged in a region away from the surface of the first and second mirror blocks and wherein the first discharge is connected to the cooling channels via branches, wherein the first discharge discharges the cooling medium flowing in one direction in one half of the cooling channels, and a second discharge discharges the cooling medium flowing in the opposite direction in the other half of the cooling channels.

8. The injection-moulding tool according to claim 7, further comprising a single feed, wherein the first and second discharges or their respective branches are arranged in one of the first and second mirror blocks laterally alongside the feed, whereby inlets and outlets in the cooling channels interlock in a radial direction when all the cooling channels are constructed to follow circular lines and each of the cooling channels is situated the same distance from the surface of the first and second mirror blocks.

9. The injection-moulding tool according to claim 8, wherein the cooling medium is one of steam, water and organic compounds wherein the cooling medium is provided in the cooling channels via a single feed line from a single temperature-control unit.

10. The injection-moulding tool according to claim 1, further comprising:
    a form ring, wherein the form ring concentrically encloses the first mirror block to close the injection mould towards the outer edge and wherein the form ring is movable in relation to the first mirror block; and
    a second means for controlling the temperature of the form ring, wherein the second means is arranged in an interior of the form ring.

11. The injection-moulding tool according to claim 10, wherein the second means is adapted to be electrically controlled or controlled with the aid of a temperature-control medium.

12. The injection-moulding tool according to claim 11, further comprising one of a sliding ring and a sliding bearing arranged concentrically between the first mirror block and the form ring enclosing the first mirror block.

13. A method for producing mouldings in disc form comprising the steps of:
    a) using an injection-moulding tool, wherein the injection-moulding tool comprises:
    a first and a second mirror block, wherein the first and second mirror blocks lie opposite each other and are movable in relation to each other for the opening and closing of the mould;
    means for actively controlling the temperature of at least one of the first and second mirror blocks wherein the means comprise at least 4 cooling channels, wherein the cooling channels are constructed to follow parallel concentric paths essentially on circular lines; and
    at least one feed for cooling medium and a first discharge for the cooling medium, wherein the cooling channels are connected to the feed and the first discharge so that the cooling medium carried in the cooling channels is discharged from the mirror block via the first discharge after circulating only once, wherein the cooling channels are supplied with the cooling medium via a single feed within the mirror block, wherein the cooling channels are arranged parallel to the surface of the mirror block that is facing the injection mould and are arranged in a region near the surface, and wherein the single feed is arranged in the mirror block in a region away from the surface and is connected to the cooling channels via branches; and b) keeping the surface of at least one of the first and second mirror blocks at a defined process temperature by means of the cooling channels.

14. An injection-moulding tool for the production of a mould in disc form, wherein the injection-moulding tool comprises:
a first and a second mirror block, wherein the first and second mirror blocks lie opposite each other and are movable in relation to each other for the opening and closing of the mould;
means for actively controlling the temperature of at least one of the first and second mirror blocks wherein the means comprise at least 4 cooling channels, wherein the cooling channels are constructed to follow parallel concentric paths essentially on circular lines; and
at least one feed for cooling medium and a first discharge for the cooling medium, wherein the cooling channels are connected to the feed and the first discharge so that the cooling medium carried in each of the cooling channels is discharged from the mirror block via the first discharge after circulating only once.

* * * * *

UNITED STATES PATENT AND TRADEMARK OFFICE
CERTIFICATE OF CORRECTION

PATENT NO. : 7,300,609 B2 Page 1 of 1
APPLICATION NO. : 10/935425
DATED : November 27, 2007
INVENTOR(S) : Gabriel It is certified that error appears in the above-identified patent and that said Letters Patent is hereby corrected as shown below:

Column 7, Line 64, Claim 6, "4—487 10 mm" should read -- 4—10 mm --

Signed and Sealed this

Thirteenth Day of May, 2008

JON W. DUDAS
*Director of the United States Patent and Trademark Office*